United States Patent
Sampathkumar (10) Patent No.: US 9,280,478 B2
(45) Date of Patent: Mar. 8, 2016

(54) CACHE REBUILDS BASED ON TRACKING DATA FOR CACHE ENTRIES

(71) Applicant: LSI CORPORATION, San Jose, CA (US)

(72) Inventor: Kishore K. Sampathkumar, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 259 days.

(21) Appl. No.: 13/971,205

(22) Filed: Aug. 20, 2013

(65) Prior Publication Data

US 2014/0325145 A1    Oct. 30, 2014

(30) Foreign Application Priority Data

Apr. 26, 2013    (IN) .......................... 1886/CHE/2013

(51) Int. Cl.
| | |
|---|---|
| G06F 12/00 | (2006.01) |
| G06F 12/08 | (2006.01) |
| G06F 11/14 | (2006.01) |
| G06F 3/06 | (2006.01) |
| G06F 11/00 | (2006.01) |

(52) U.S. Cl.
CPC .......... *G06F 12/0868* (2013.01); *G06F 3/0604* (2013.01); *G06F 3/0619* (2013.01); *G06F 3/0653* (2013.01); *G06F 11/00* (2013.01); *G06F 11/14* (2013.01); *G06F 11/1435* (2013.01); *G06F 11/1446* (2013.01); *G06F 11/1448* (2013.01)

(58) Field of Classification Search
None
See application file for complete search history.

(56) References Cited

U.S. PATENT DOCUMENTS

| | | | |
|---|---|---|---|
| 6,438,661 | B1 | 8/2002 | Beardsley et al. |
| 6,502,174 | B1 | 12/2002 | Beardsley et al. |
| 6,988,171 | B2 | 1/2006 | Beardsley et al. |
| 7,139,933 | B2 | 11/2006 | Hsu et al. |
| 2011/0191522 | A1 | 8/2011 | Condict et al. |
| 2013/0054869 | A1 | 2/2013 | Tolia et al. |

*Primary Examiner* — Midys Rojas

(57) ABSTRACT

Methods and structure are provided for rebuilding cache data from a failed cache device based on tracking data for the failed cache device. The system includes a memory and a cache manager. The memory stores tracking data that correlates entries at a cache with logical block addresses of a logical volume. The cache manager is able to determine that a device implementing the cache has failed and to analyze the tracking data to identify logical block addresses correlated with cache entries from the failed cache device. The cache manager is further able to generate new cache entries at a new cache device, and to populate the new cache entries with data from the identified logical block addresses.

20 Claims, 7 Drawing Sheets

FIG. 3

TRACKING DATA

| LBA | CACHE WINDOW |
|---|---|
| ADDRESS Q | WINDOW A |
| ADDRESS Y | WINDOW A |
| ADDRESS Z | WINDOW A |
| ... | ... |
| ADDRESS ZZ | WINDOW D |

← 310

312

ACTIVE CACHE WINDOW A

| CACHE LINE | CACHE DATA | LBA |
|---|---|---|
| LINE 1 | DATA A | ADDRESS X |
| LINE 2 | DATA B | ADDRESS Y |
| LINE 3 | DATA C | ADDRESS Z |
| ... | ... | ... |
| LINE 16 | DATA D | ADDRESS Q |

CACHE REBUILDS BASED ON TRACKING DATA FOR CACHE ENTRIES

CROSS REFERENCE TO RELATED APPLICATIONS

This document claims priority to Indian Patent Application Number 1886/CHE/2013 filed on Apr. 26, 2013 (entitled PREEMPTIVE CONNECTION SWITCHING FOR SERIAL ATTACHED SMALL COMPUTER SYSTEM-INTERFACE SYSTEMS) which is hereby incorporated by reference.

FIELD OF THE INVENTION

The invention relates generally to storage systems, and more specifically to caching for storage systems.

BACKGROUND

In storage systems, data for a host is maintained on one or more storage devices (e.g., spinning disk hard drives) for safekeeping and retrieval. However, the storage devices may have latency or throughput issues that increase the amount of time that it takes to retrieve data for the host. Thus, many storage systems include one or more cache devices for storing "hot" data that is regularly accessed by the host. The cache devices can retrieve data much faster than the storage devices, but have a smaller capacity. Tracking data for the cache device is used to indicate what data is currently cached, and can also indicate where cached data is found on each cache device. When a cache device fails, its existing cache data and tracking data is invalidated and removed.

SUMMARY

Systems and methods herein provide storage systems that use tracking data for cache entries at a failed cache device to rebuild cache data onto a new cache device. The tracking data for the invalidated cache device can be used to identify "hot" data that is regularly accessed by the host. This hot data can then be copied into the new cache device.

One exemplary embodiment is a system that includes a memory and a cache manager. The memory stores tracking data that correlates entries at a cache with logical block addresses of a logical volume. The cache manager is able to determine that a device implementing the cache has failed and to analyze the tracking data to identify logical block addresses correlated with cache entries from the failed cache device. The cache manager is further able to generate new cache entries at a new cache device, and to populate the new cache entries with data from the identified logical block addresses.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
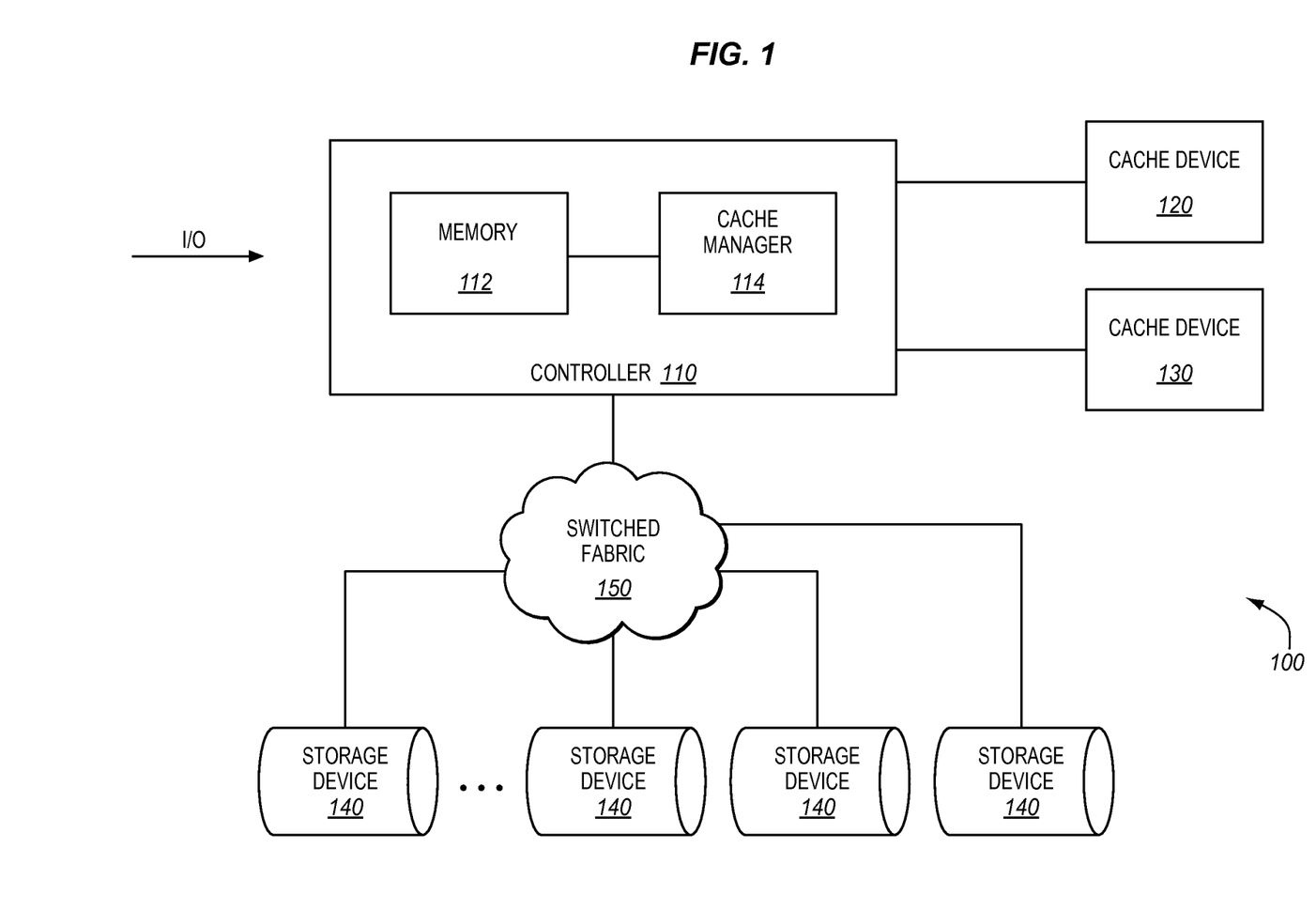
FIG. 1 is a block diagram of an exemplary storage system.

FIG. 1 is a block diagram of an exemplary storage system 100. Storage system 100 uses tracking data for a failed cache device in order to rebuild failed cache data onto one or more other cache devices. In this embodiment, storage system 100 includes controller 110, which maintains data at one or more persistent storage devices 140 (e.g., magnetic hard disks) on behalf of a host. In one embodiment, controller 110 is a storage controller, such as a Host Bus Adapter (HBA) that receives Input/Output (I/O) operations from the host and translates the I/O operations into commands for storage devices in a Redundant Array of Independent Disks (RAID) configuration.

In embodiments where controller 110 is independent from the host, controller 110 manages I/O from the host and distributes the I/O to storage devices 140. Controller 110 communicates with storage devices 140 via switched fabric 150. Storage devices 140 implement the persistent storage capacity of storage system 100, and are capable of writing and/or reading data in a computer readable format. For example, storage devices 140 may comprise magnetic hard disks, solid state drives, optical media, etc. compliant with protocols for Serial Attached SCSI (SAS), Serial Advanced Technology Attachment (SATA), Fibre Channel, etc.

Switched fabric 150 comprises any suitable combination of communication channels operable to forward/route communications for storage system 100, for example, according to protocols for one or more of Small Computer System Interface (SCSI), SAS, FibreChannel, Ethernet, Internet SCSI (ISCSI), etc. In one embodiment, switched fabric 150 comprises a combination of SAS expanders that link to one or more SAS/SATA targets (e.g., storage devices 140).

Controller 110 is also capable of managing cache devices 120 and 130 in order to maintain a write-through cache for servicing read requests from the host. For example, in one embodiment cache devices 120 and 130 comprise Non-Volatile Random Access Memory (NVRAM) storage devices, flash memory, or other memory devices that exhibit substantial throughput and low latency.

Cache manager 114 maintains tracking data for each cache device in memory 112. In one embodiment, the tracking data indicates which Logical Block Addresses (LBAs) for a logical volume are duplicated to cache memory from persistent storage at storage devices 140. If an incoming read request is directed to a cached LBA, cache manager 114 may direct the request to the appropriate cache device (instead of one of persistent storage devices 140) in order to retrieve the data more quickly. Cache manager 114 may be implemented as custom circuitry, as a processor executing programmed instructions stored in program memory, or some combination thereof.

The particular arrangement, number, and configuration of components described herein is exemplary and non-limiting. While in operation, cache manager 114 is able to update the tracking data stored in memory 112, to update cache data stored on each cache device, and to perform various management tasks such as invalidating cache data, rebuilding cache data, and revising cache data based on the I/O operations from the host. Further details of the operation of storage system 100 will be described with respect to method 200 of FIG. 2 below.

Figure 2:
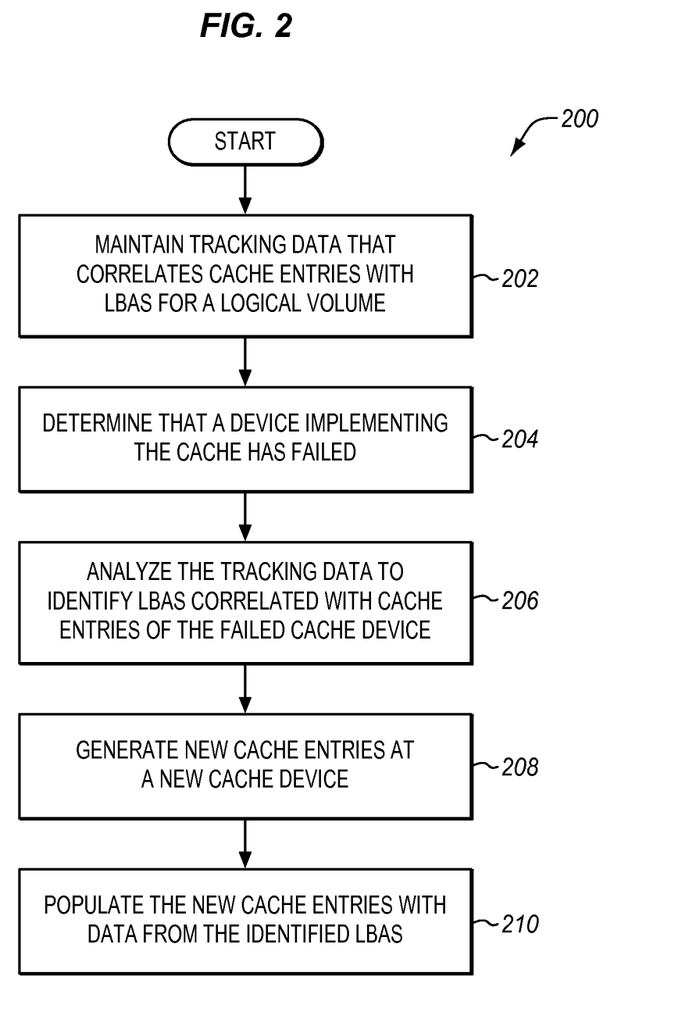
FIG. 2 is a flowchart describing an exemplary method of utilizing tracking data to rebuild a cache.

FIG. 2 is a flowchart describing an exemplary method 200 of utilizing tracking data to rebuild a cache. According to FIG. 2, in step 202, cache manager 114 maintains tracking data that correlates individual cache entries (e.g., at cache devices 120 and/or 130) with LBAs for a logical volume (e.g., a RAID logical volume implemented by storage devices 140). The tracking data is used by cache manager 114 to quickly determine if, and/or where data for an incoming read request is cached. Thus, during normal operations, this tracking data may be updated when the cache itself is revised to store whatever data for the logical volume is currently "hot" (i.e., accessed frequently by the host).

In step 204, cache manager 114 determines that a device implementing the cache has failed. For example, assuming that cache device 120 has failed, cache manager 114 may detect a failure by determining that the cache device is no longer responsive, by receiving input from a system operator, or by any other suitable means. In the context of this application, a "failure" refers to planned failovers of a cache device as well as unplanned failovers of a cache device. Once the cache device has failed, cache manager may temporarily freeze I/O directed to cache entries on the failed device.

In step 206, cache manager 114 analyzes tracking data stored in memory 112 in order to identify LBAs that are correlated with the cache entries of the failed cache device. In one embodiment, this includes reviewing the tracking data to identify cache entries that formerly resided on the failed cache device, and then determining the LBAs represented by each cache entry on the failed device.

In step 208, cache manager 114 generates new cache entries at a new cache device. The new cache device may be a cache device that is added to the system, or the new cache device may be a cache device that is already residing on storage system 100. Each new cache entry generated by cache manager 114 corresponds with a failed cache entry. Thus, each new cache entry inherits the tracking data of a failed cache entry and takes on the role of a cache entry from the failed device.

In step 210, cache manager 114 populates each new cache entry with data from the LBAs that it represents. Cache manager 114 therefore accesses persistently stored data at storage devices 140, and proceeds to copy LBA data from persistent storage to the appropriate cache entries.

Using method 200 described above, entries from a failed cache device can be re-created in a manner that is quick and efficient. Furthermore, instead of discarding the tracking data for failed cache entries, the tracking data is used to determine what data was originally stored on the cache. This means that instead of slowly re-building a list of "hot" data stored at a logical volume, the hot data can be immediately identified and rebuilt using the tracking data. The cache can therefore be quickly restored and filled with data.

Even though the steps of method 200 are described with reference to storage system 100 of FIG. 1, method 200 may be performed in other storage systems. The steps of the flowcharts described herein are not all inclusive and may include other steps not shown. The steps described herein may also be performed in an alternative order.

EXAMPLES

The following examples illustrate specific scenarios where tracking data is used to rebuild cache data. In these examples, each cache device is logically divided into a number of cache windows (e.g., 1 MB cache windows). Each cache window includes multiple cache lines (e.g., 16 individual 64 KB cache lines). For each cache window, the validity of each cache line is tracked with a bitmap. If data in a cache line is invalid, the cache line no longer accurately reflects data maintained in persistent storage. Therefore, invalid cache lines are not used until after they are rebuilt with fresh data from the storage devices of the system.

If a cache window includes any valid cache lines, it is marked as active. However, if a cache window does not include any valid cache lines, it is marked as free. Active cache windows are linked to a hash list. The hash list is used to correlate Logical Block Addresses (LBAs) requested by a host with active cache windows residing on one or more cache devices. In contrast to active cache windows, free cache windows are filled with new cache data for new LBAs. One metric for invalidating cache lines and freeing up more space in the cache is maintaining a Least Recently Used (LRU) list for the cache windows. If a cache window is at the bottom of the LRU list (i.e., if it was accessed the longest time ago of any cache window), it may be invalidated to free up more space when the cache is full. An LRU list may track accesses on a line-by-line, or window-by-window basis.

To determine what data to write to newly available free cache windows, cache manager 114 maintains a list of cache misses in memory. A cache miss occurs when the host requests data that is not stored in the cache. If a certain LBA (or range of LBAs) is associated with a large number of cache misses, the data for that LBA may be added to one or more free cache windows. Specific embodiments of tracking data and cache windows are shown in FIG. 3, discussed below.

Figure 3:
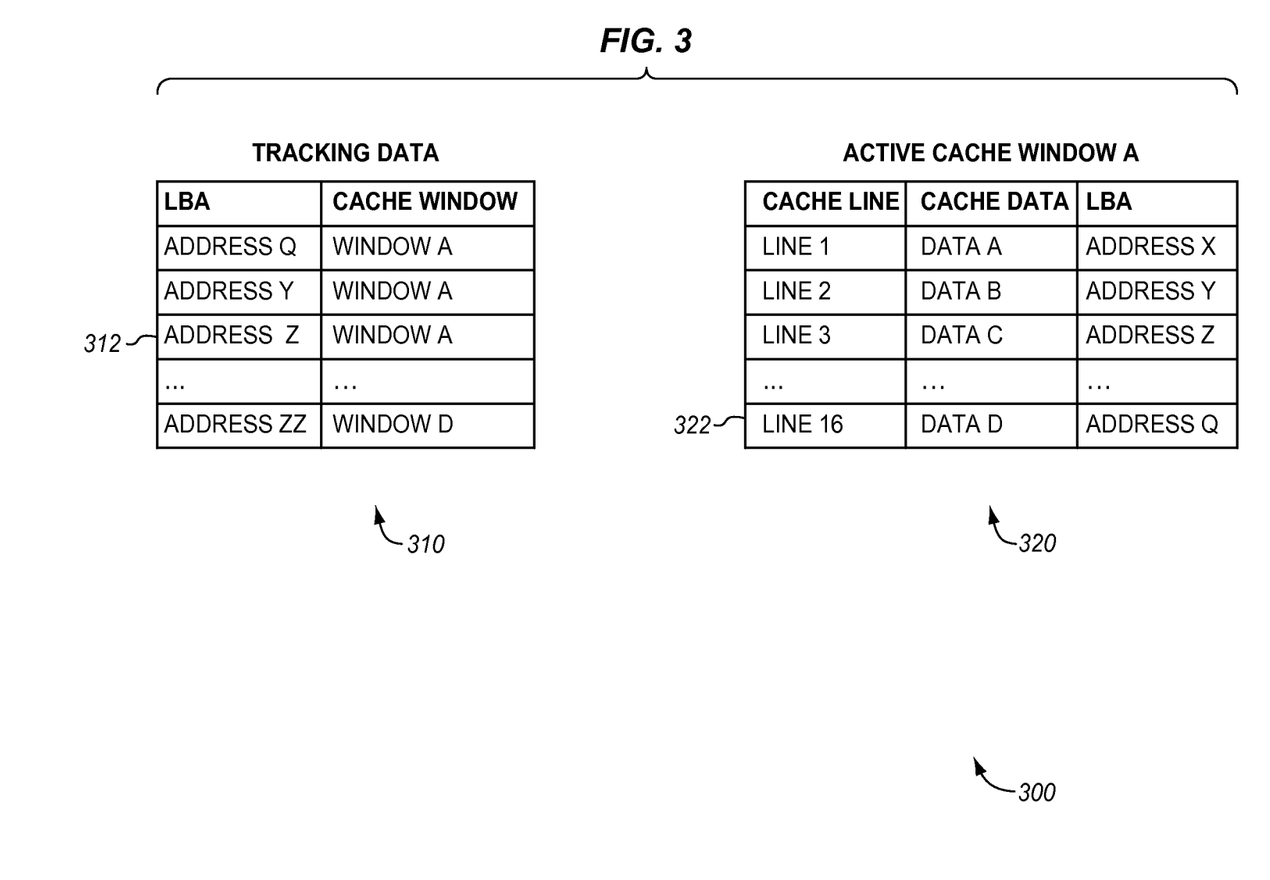
FIG. 3 is a block diagram illustrating an exemplary set of tracking data for a cache window.

FIG. 3 is a block diagram 300 illustrating exemplary tracking data 310 and an exemplary cache window 320. Cache window 320 includes multiple lines 322 of cache data. Each cache line is associated with one or more LBAs. Tracking data 310 includes entries 312 that each correlate one or more LBAs with cache windows. Thus, when an incoming read request (directed to a range of LBAs) is received from the host, the appropriate cache window (and line) can be quickly retrieved and provided. In some embodiments, the tracking data uses hash values to indicate the identity of each cache window and/or LBA.

In this embodiment, the data validity for each cache window is tracked on a cache line by cache line basis by using a bitmap, where each bit corresponds to a specific cache line. If the bit value for a cache line is set (e.g., to a value "1"), the corresponding cache line has valid data. The term "cache line is valid" is used to indicate this. If the bit value is clear (e.g., a value of "0"), the corresponding cache line has no valid data yet. The term "cache line is invalid" is used to indicate this.

Figure 4:
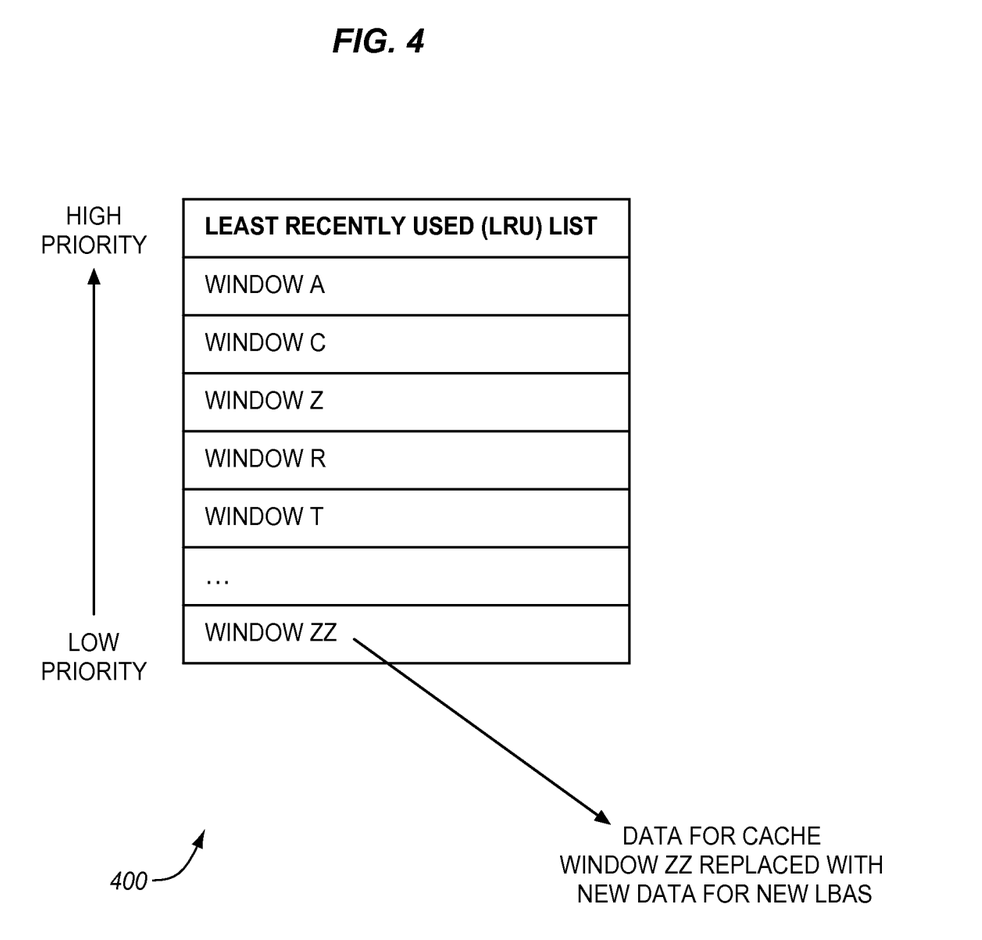
FIG. 4 is a block diagram illustrating an exemplary Least Recently Used (LRU) priority list for a cache.

FIG. 4 is a block diagram illustrating an exemplary Least Recently Used (LRU) priority list 400 for a cache. In FIG. 4, LRU priority list 400 includes multiple entries. Each entry corresponds with a cache window, and the list is sorted so that the most recently used cache window (e.g., the highest priority cache window) is placed at the top of the list. If a cache window drops down to the bottom of list 400 (i.e., because it is seldom accessed) the cache window may be set free and its data may be replaced with other data for LBAs that are currently "hot." In this example, the data in cache window ZZ is replaced with data for LBAs that have recently experienced a large number of cache misses.

Figure 5:
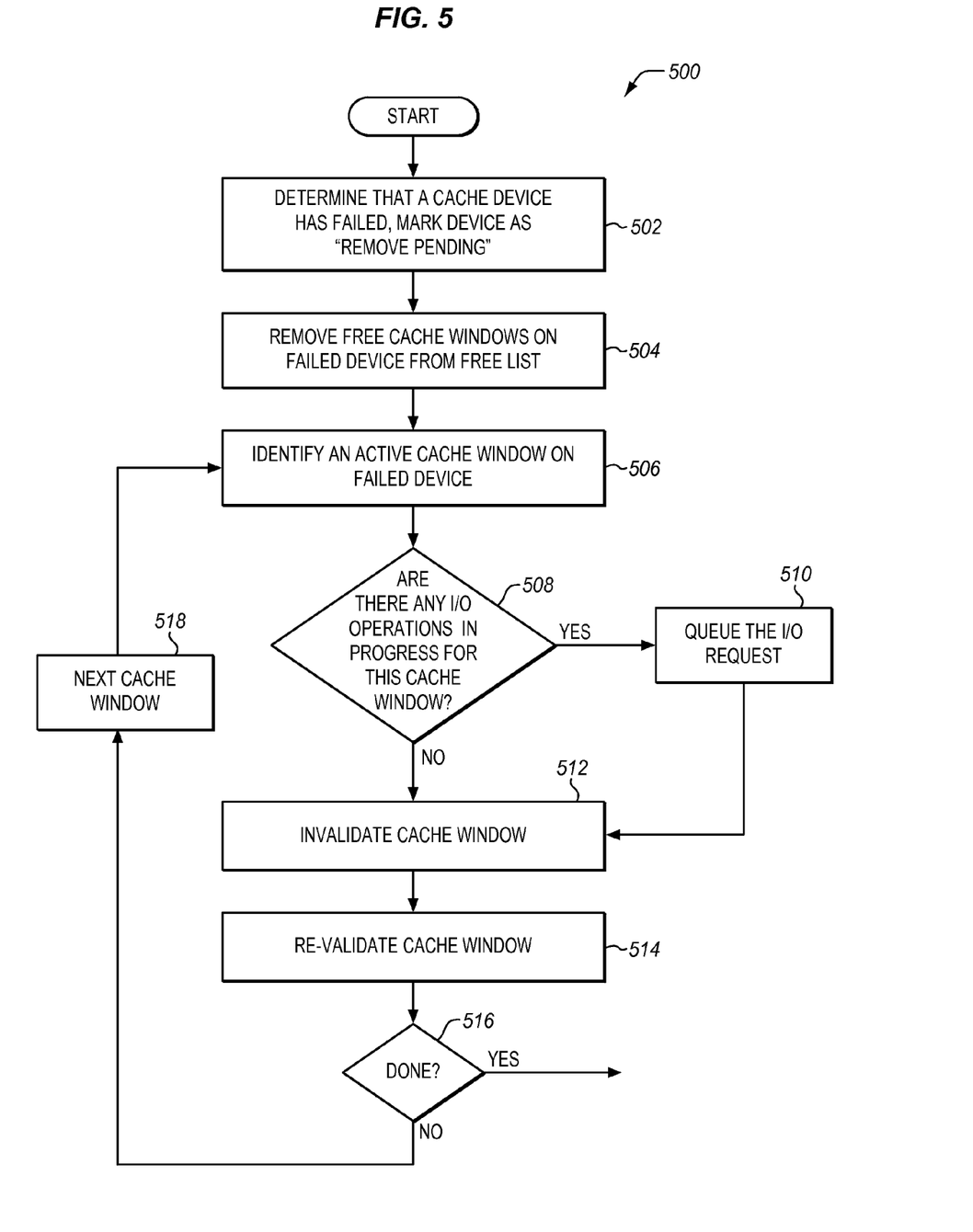
FIG. 5 is a flowchart describing a further exemplary method of utilizing tracking data to rebuild a cache.

FIG. 5 is a flowchart describing a further exemplary method 500 of utilizing tracking data to rebuild a cache. According to FIG. 5, whenever cache manager 114 detects that a cache device has failed, it marks the device in memory as REMOVE PENDING in step 502. Cache manager 114 then proceeds in step 504 to review a list of free cache windows for the cache. If any of the free cache windows were stored on the failed cache device, cache manager 114 removes those cache windows from the list. This prevents the system from attempting to store data on a cache window that cannot currently be accessed.

In step 506, cache manager 114 identifies a cache window that was active on the failed cache device. For example, cache manager 114 can review tracking data to identify an active cache window from the failed cache device. In one embodiment, cache manager 114 selects the highest priority active cache window (as indicated by an LRU list) from the failed cache device.

In step 508 cache manager 114 determines whether any read operations are pending or in progress for the identified cache window. If a read operation is in progress, then cache manager 114 queues the read operation (or directs it to persistent storage) in step 510 and proceeds to step 512. Alternatively, if no read operations are in progress for the cache window, cache manager 114 proceeds from step 508 to step 512.

In step 512, cache manager 114 invalidates the identified cache window. Invalidating the cache window effectively eliminates the cache window from the cache. This keeps incoming read requests from attempting to access the cache window.

In step 514, cache manager 114 re-validates the cache window. Re-validation is a procedure described more fully with regard to FIG. 6 below. In short, re-validation involves creating a new cache window that inherits the tracking data of the invalidated cache window, populating the new cache window with data that was previously stored on the invalidated cache window, and making the new cache window take the place of the invalidated cache window (which is inaccessible because it resides on a failed cache device). Once the new cache window has been made valid and active, any queued read commands for the old cache window may be sent to the new cache window. In a further embodiment, cache data can be re-validated on a line-by-line, instead of a window-by-window basis.

In step 516, cache manager 114 determines whether it has re-validated enough cache windows (e.g., all or some fraction of the cache windows) on the failed cache device. If so, cache manager 114 marks the failed cache device as REMOVE DONE, and resumes normal cache management operations of tracking hot data at the cache, and updating the cache with new hot data. Alternatively, if there are still active cache windows that have not been revalidated, cache manager 114 identifies a new cache window to re-validate. For example, cache manager 114 can identify the next-highest priority cache window that has not yet been re-validated.

Figure 6:
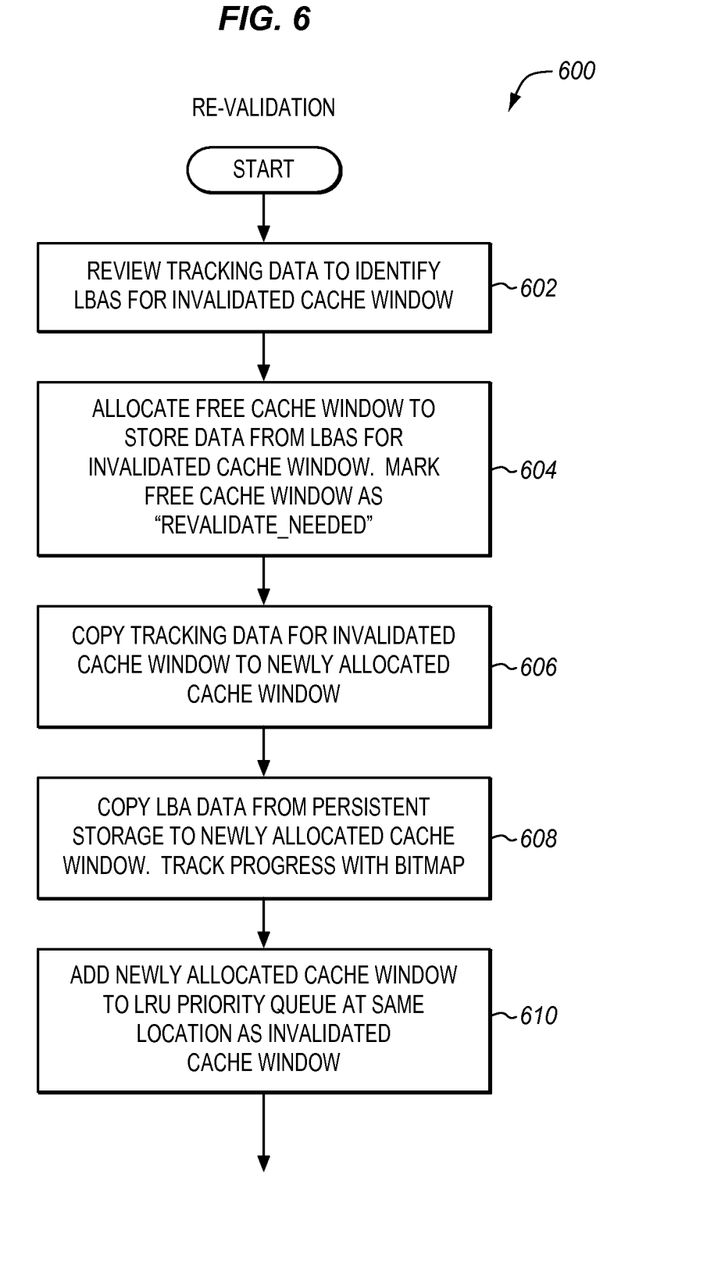
FIG. 6 is a flowchart describing an exemplary method for re-validating a cache window from a failed cache device.

FIG. 6 is a flowchart describing an exemplary method for re-validating a cache window from a failed cache device. According to FIG. 6, when a cache window is re-validated in step 602, cache manager 114 reviews the tracking data to identify each LBA that the invalidated cache window stored data for. In step 604, cache manager 114 allocates a free cache window on another cache device to store data for the LBAs as the invalidated cache window. The newly allocated free cache window is marked with the REVALIDATE_NEEDED state to indicate that this cache window will undergo cache revalidation. Once the revalidation is completed, the REVALIDATE_NEEDED state is cleared on this cache window.

In step 606, cache manager 114 copies the tracking data for the invalidated cache window to the newly allocated cache window, so that the new cache window takes the place of the invalidated cache window (i.e., so that incoming read requests are sent directly to the new cache window, and not the invalidated cache window). As a part of this step, cache manager 114 reviews a validity bitmap for the new cache window. The validity bitmap for the new cache window is initially cleared. The validity bitmap indicates, on a line by line basis, whether the data in the new cache window is valid or needs to be rebuilt from persistent storage. Since the new cache window is empty and does not yet include any data, cache manager 114 uses the validity bitmap to mark each line of the new cache window as invalid. This in turn causes cache manager 114 to copy data from persistent storage into the new cache window.

In some embodiments, a validity bitmap alone is insufficient to revalidate the new cache window. In such cases, a revalidation bitmap can be used to track the revalidation of each cache line in the new cache window. This revalidation bitmap for the new cache window is initially created as a duplicate of the validity bitmap for the cache window that was invalidated. Each bit that is set in the revalidation bitmap indicates a cache line that was valid in the cache window being replaced but currently invalid in the new cache window. Such cache lines should be revalidated.

In step 608, cache manager copies LBA data from persistent storage to the newly allocated cache data, in order to fill the newly allocated cache window with data. As each cache line is revalidated in the new cache window, the corresponding bit is marked as valid in validity bitmap in the new cache window, and the progress of revalidation is indicated by clearing the corresponding bit in the revalidation bitmap for the new cache window.

In one embodiment, I/O requests issued on cache windows marked for revalidation can result in "on demand" prioritized revalidation of the corresponding cache lines. For example, cache lines with an associated I/O request may be prioritized out-of-sequence so that they are immediately revalidated when the I/O request is received.

In step 610, cache manager 114 adds the newly allocated cache window to a Least Recently Used (LRU) priority queue at the same location as the invalidated cache window. In this manner, the newly allocated window takes the place of the (now unavailable) invalidated cache window from the failed cache device.

In a further embodiment, the newly allocated cache window is given a slightly lower position in the LRU priority queue than the invalidated cache window (i.e., one position lower). In another embodiment, the position of the newly allocated cache window in the LRU priority list is determined by the number of valid cache lines in the newly allocated cache window, and/or how frequently the invalidated cache window was accessed historically.

In one embodiment, the revalidation of the cache as a whole can be both "progressive" and "cumulative" in nature. In this embodiment, the revalidation of the cache continues for each cache window, but certain cache lines and/or windows are processed out-of-sequence. For example, whenever I/O is directed to cache lines of a new cache window that still need revalidation, those cache lines are revalidated as the I/O request is processed (i.e., out-of-sequence with the rest of the revalidation process). In such cases, when the revalidation process reaches cache lines that have already been revalidated, it skips over such revalidated cache lines.

For each cache window in the I/O range covered by an I/O request that is also marked "REVALIDATE NEEDED," the following steps can be taken. For each cache line involved in the I/O, if a corresponding bit is set in the validity bitmap for the new cache window, skip revalidation for this line (the validity bitmap shows that the cache line has already been revalidated).

However, if the corresponding bit in the validity bitmap has not been set, and the corresponding bit in the revalidation bitmap has been set, then revalidation of the cache line is desired. In such cases, the following sub-steps are performed to revalidate the cache line. First, the cache line is read from persistent storage, then the cache line is written to the new cache window. Further, the corresponding cache line is marked in the new cache window as valid by setting the corresponding bit in the validity bitmap for the new cache window. The progress of revalidation is then tracked by clearing the corresponding bit for the cache line in the revalidation bitmap for the new cache window.

If there are no more cache lines to be revalidated in the new cache window (e.g., if all bits are cleared in the revalidation bitmap for the new cache window), the "REVALIDATE NEEDED" state for that cache window is cleared.

Figure 7:
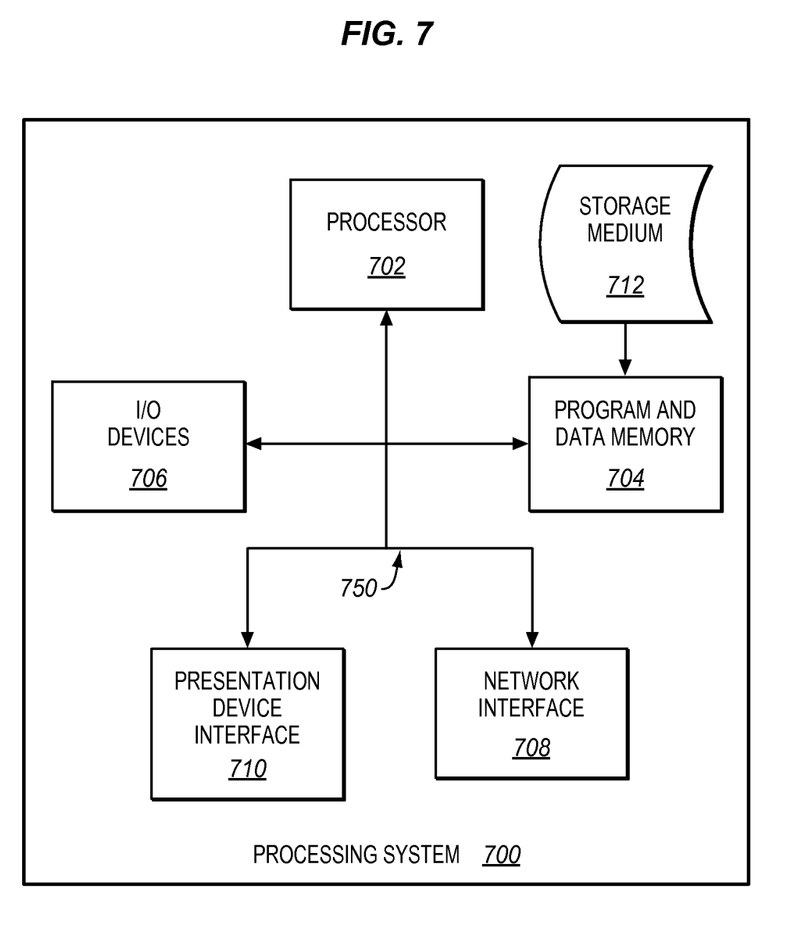
FIG. 7 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of cache manager 114 to perform the various operations disclosed herein. FIG. 7 illustrates an exemplary processing system 700 operable to execute a computer readable medium embodying programmed instructions. Processing system 700 is operable to perform the above operations by executing programmed instructions tangibly embodied on computer readable storage medium 712. In this regard, embodiments of the invention can take the form of a computer program accessible via computer readable medium 712 providing program code for use by a computer (e.g., processing system 700) or any other instruction execution system. For the purposes of this description, computer readable storage medium 712 can be anything that can contain or store the program for use by the computer (e.g., processing system 700).

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be integrated with the system to interface to one or more presentation devices, such as printing systems and displays for presentation of presentation data generated by processor 702.

What is claimed is:

1. A system, comprising:
a memory storing tracking data that correlates entries at a cache with logical block addresses of a logical volume; and
a cache manager operable to determine that a device implementing the cache has failed, to analyze the tracking data to identify logical block addresses correlated with cache entries from the failed cache device, to generate new cache entries at a new cache device, and to populate the new cache entries with data from the identified logical block addresses.

2. The system of claim 1, wherein:
the cache includes cache data for a persistent storage system; and
the cache manager is further operable to receive Input/Output from a host, and to analyze the tracking data to determine whether to direct the Input/Output to the cache or to the persistent storage system.

3. The system of claim 1, wherein:
the cache manager is further operable to update the tracking data to correlate the new cache entries with the identified logical block addresses.

4. The system of claim 1, wherein:
the cache manager maintains a list that indicates which cache entries have been least recently used, and
the cache manager is further operable to cause each new cache entry to inherit a location in the list that previously belonged to a failed cache entry.

5. The system of claim 1, wherein:
the cache manager is further operable to identify multiple new cache devices, and to distribute the new cache entries across each of the new cache devices.

6. The system of claim 1, wherein:
the system comprises a storage controller for a Redundant Array of Independent Disks storage system.

7. The system of claim 1, wherein:
each cache entry comprises a cache window that includes multiple cache lines, each cache line storing data for a range of logical block addresses, wherein the cache lines for each cache window represent a contiguous range of logical block addresses.

8. A method, comprising:
maintaining tracking data that correlates entries at a cache with logical block addresses of a logical volume;
determining that a device implementing the cache has failed;

analyzing the tracking data to identify logical block addresses correlated with cache entries from the failed cache device;
generating new cache entries at a new cache device; and
populating the new cache entries with data from the identified logical block addresses.

9. The method of claim 8, wherein:
the cache includes cache data for a persistent storage system; and
the method further comprises:
    receiving Input/Output from a host; and
    analyzing the tracking data to determine whether to direct the Input/Output to the cache or to the persistent storage system.

10. The method of claim 8, further comprising:
updating the tracking data to correlate the new cache entries with the identified logical block addresses.

11. The method of claim 8, further comprising:
maintaining a list that indicates which cache entries have been least recently used; and
causing each new cache entry to inherit a location in the list that previously belonged to a failed cache entry.

12. The method of claim 8, further comprising:
identifying multiple new cache devices; and
distributing the new cache entries across each of the new cache devices.

13. The method of claim 8, wherein:
the tracking data is stored at a storage controller for a Redundant Array of Independent Disks storage system.

14. The method of claim 8, wherein:
each cache entry comprises a cache window that includes multiple cache lines, each cache line storing data for a range of logical block addresses, wherein the cache lines for each cache window represent a contiguous range of logical block addresses.

15. A non-transitory computer readable medium embodying programmed instructions which, when executed by a processor, are operable for performing a method comprising:
maintaining tracking data that correlates entries at a cache with logical block addresses of a logical volume;
determining that a device implementing the cache has failed;
analyzing the tracking data to identify logical block addresses correlated with cache entries from the failed cache device;
generating new cache entries at a new cache device; and
populating the new cache entries with data from the identified logical block addresses.

16. The medium of claim 15, wherein:
the cache includes cache data for a persistent storage system; and
the method further comprises:
    receiving Input/Output from a host; and
    analyzing the tracking data to determine whether to direct the Input/Output to the cache or to the persistent storage system.

17. The medium of claim 15, the method further comprising:
updating the tracking data to correlate the new cache entries with the identified logical block addresses.

18. The medium of claim 15, the method further comprising:
maintaining a list that indicates which cache entries have been least recently used; and
causing each new cache entry to inherit a location in the list that previously belonged to a failed cache entry.

19. The medium of claim 15, the method further comprising:
identifying multiple new cache devices; and
distributing the new cache entries across each of the new cache devices.

20. The medium of claim 15, wherein:
the tracking data is stored at a storage controller for a Redundant Array of Independent Disks storage system.

* * * * *